United States Patent Office.

SAMUEL T. FOWLER, OF BROOKLYN, NEW YORK.

Letters Patent No. 69,331, dated October 1, 1867.

---

IMPROVED COMPOSITION OF MATTER FOR FILLING SAFES, AND FOR OTHER PURPOSES.

---

*The Schedule referred to in these Letters Patent and making part of the same.*

---

TO ALL WHOM IT MAY CONCERN:

Be it known that I, SAMUEL T. FOWLER, of Brooklyn, in the county of Kings, and State of New York, have invented a certain new and useful composition of matter, useful in the formation of the walls of fire-proof safes, concrete houses, ice-houses, vaults, the tops or arches of cisterns, and in the formation of concrete roofs, and in deafening the floors of houses, and other similar purposes; and I do hereby declare the following to be such a full, clear, and exact description thereof as will enable any one skilled in the arts to which it appertains to make and use the same.

This invention relates to the composition of mortar to be used for any of the above-mentioned or similar purposes, and is intended to cheapen and lighten such mortar without in any way detracting from its usefulness or adaptability in other respects, and is more especially intended to provide a more perfect protection against fire and the changes of temperature.

The invention consists in uniting or mixing saw-dust or other similar fibrous material with the mortar, whether it be made of lime and sand, or of lime, or plaster of Paris, or of hydraulic cement, with or without sand, or of clay.

In the practice of this invention, broken corn-cobs, chips, or tan-bark, form a very good substitute for the saw-dust. But in preparing the mortar for fire-proof safes or vaults, I prefer to use saw-dust, mixed with hydraulic cement and hot water, as described in my patent dated January 9, 1866, using the saw-dust and cement in the proportion of about five of saw-dust to two or three of cement, by weight, as the case may seem to require.

For filling in the framework of concrete houses, such, for example, as one described in my patent dated the first of May, 1860, for improvement in construction of concrete walls, the coarser materials, such as corn-cobs or chips, are most economical, in that less lime or cement is required to make a good, substantial wall to plaster on. But I propose to use any of the woody or fibrous materials properly prepared, as the case may require or admit of, mixed or united with any one or more of the aforementioned substances, or any combination which may or can be made thereof.

The composition may be made in the form of brick or tile, and used in constructing the walls in any of the aforementioned structures, or for any other suitable purpose.

When this composition is to be used in the construction of a roof, the saw-dust or other equally fine material should be used, and the mortar should be laid on boards or other suitable supporting material, and covered with some good water-proof material, such as plastic slate, for example, or any similar material, impervious to and insoluble in water.

Having now described the nature and extent of my invention, I claim, and desire to secure by Letters Patent—

The use of saw-dust or its substitute for this purpose, in combination with any one or more of the plastic materials herein described, for the purpose specified.

SAMUEL T. FOWLER.

Witnesses:
AMOS BROADNAX,
EDWARD P. FLINT.